United States Patent [19]

Kyomasu et al.

[11] 4,315,199
[45] Feb. 9, 1982

[54] CONTROL CIRCUIT FOR A POSITIONING DEVICE USING A D-C MOTOR

[75] Inventors: Ryuichi Kyomasu, Kodaira; Shuichi Hanashima, Tokyo; Yoshikazu Suzumura, Fuchu, all of Japan

[73] Assignee: Hitachi, Ltd., Tokyo, Japan

[21] Appl. No.: 63,450

[22] Filed: Aug. 3, 1979

[30] Foreign Application Priority Data

Aug. 9, 1978 [JP] Japan .................................. 53-96229

[51] Int. Cl.³ ............................................. G05B 19/29
[52] U.S. Cl. .................................... 318/601; 318/603; 318/611; 318/640
[58] Field of Search ............... 318/601, 603, 611, 640

[56] References Cited

U.S. PATENT DOCUMENTS 3,655,957  4/1972  McIntosh ............................ 318/601
3,843,915  10/1974  Helmbold ........................... 318/603
4,229,684  10/1980  Saglini et al. ...................... 318/611

Primary Examiner—J. V. Truhe
Assistant Examiner—Eugene S. Indyk
Attorney, Agent, or Firm—Craig and Antonelli

[57] ABSTRACT

Disclosed is a control circuit of a positioning device for moving a member to be controlled to a predetermined position by using a d-c motor, in which there are used arithmetic circuit means for detecting a difference signal, to be converted to a driving signal of the motor, between the position detecting signal of the member and the reference signal of the predetermined position, and correcting circuit means coupled to the arithmetic circuit means for causing the difference signal to be small, whereby the motor is free from the hunting phenomenon.

2 Claims, 6 Drawing Figures

CONTROL CIRCUIT FOR A POSITIONING DEVICE USING A D-C MOTOR

BACKGROUND OF THE INVENTION

The present invention relates to a control circuit for a positioning device using a d-c motor.

The positioning device will be used for the production of semiconductor devices such as transistors and integrated circuits. In a pellet-bonding device, a semiconductor pellet is automatically brought into position on a portion for mounting the pellet in a package or a lead frame, and is fastened to the pellet-mounting portion. In a wire-bonding device, a capillary for holding a connector wire made of gold or aluminum is positioned on an electrode of the semiconductor pellet or on a lead portion of the lead frame, and the connector wire held by the capillary is thermally adhered or is welded by ultrasonic waves onto the electrode or the lead portion. In such a case, objects such as capillary to be positioned are placed on a movable table and are moved to a predetermined position.

When a d-c motor is used as means for driving the positioning device, a movement detector such as linear encoder or rotary encoder is coupled to a member being controlled such as table or rotary member actuated by the motor in order to obtain electrical signals in accordance with movement, whereby the d-c motor is controlled based upon the comparison of output signals of a counter which counts the output signals of the detector with expectation signals representative of a predetermined position. When the member being controlled reaches the predetermined position, the counted output signals will become in conformity with the expectation signals; no driving signals are fed to the d-c motor.

The d-c motor, however, does not quickly come into halt due to its moment of inertia. Hence, the member being controlled may often move exceeding the predetermined position. In such a case, the d-c motor is reversely rotated based upon the comparison of the counted signals of the counter with the expectation signals.

In this case, if the position of the controlled member at which a count-up signal in movement toward one direction is fed to the counter is different from the position of the controlled member at which a count-down signal in movement toward the opposite direction is produced, a driving signal based upon the comparison of the counted signals with the expectation signals will be supplied to the d-c motor despite the controlled member has almost been returned to the predetermined position. As a result, the controlled member develops hunting.

SUMMARY OF THE INVENTION

The object of the present invention is to provide a positioning device which is free from the hunting phenomenon and which produces less vibration.

According to the present invention, there are used two detecting signals generated out of phase with each other in accordance with movement of a controlled member. By those two detecting signals, the moving direction of the controlled member is judged about the difference between one direction and the opposite direction. The detecting signal representative of the position or address in one direction or the opposite direction is compared with the reference signal representative of the predetermined position by a full-adder circuit. In this comparison, the full-adder receives at its carry terminal a correcting signal formed from the two detecting signals, and compares the detecting signal with the reference signal upon receipt of the correcting signal. At the output side of the full-adder, a digital-to-analog converter (D/A converter) is disposed to develop an analog signal corresponding to the difference between the detecting signal and the reference signal, and a driving signal for driving the d-c motor is developed by the D/A converter.

The above and other related objects and features of the present invention will be apparent from the following description taken in connection with the accompanying drawings.

DESCRIPTION OF THE PREFERRED EMBODIMENTS

The present invention is described below with reference to an embodiment shown in FIG. 1. FIG. 2 shows waveforms of various signals of the control circuit of FIG. 1. In FIG. 2, the ordinate represents the level of signals and the abscissa represents the position x of the controlled member.

Figure 3:
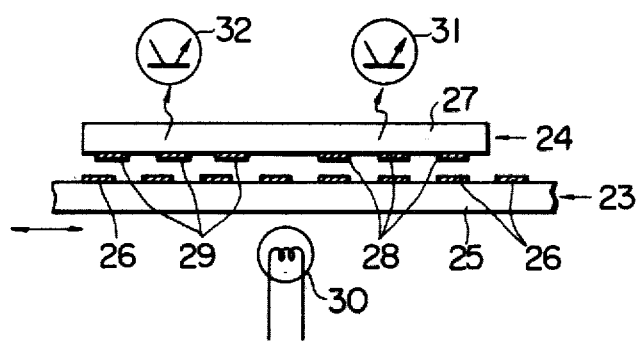
FIG. 3 is a diagrammatic illustration of a rotary encoder utilized in the present invention.

Reference numeral 17 denotes a d-c motor for providing the driving force to move the controlled member. This motor 17 includes a movement detector 18 for producing two pulse signals $\phi_A$ and $\phi_B$ with a phase difference in accordance with the rotating direction. The movement detector 18 is, by way of example, composed of such rotary encoder as shown in FIG. 3. In FIG. 3, the rotary encoder includes a rotating disc 23 and a fixed plate 24. The rotating disc 23 has opaque layers 26 of, for example, 5 μm which are repeatedly arranged with a constant space on a transparent substrate 25. Similarly, the fixed plate 24 has a first group of opaque layers 28 and a second group of opaque layers 29, which are formed on a transparent substrate 27. The first group of opaque layers and the second group of opaque layers serve as a first and a second detecting portion, respectively. In order to produce two pulse signals $\phi_A$ and $\phi_B$ in accordance with the rotation of the d-c motor, the rotating disc 23 and the fixed plate 24 are illuminated by a light source 30 from one side thereof, and light which is transmitted through the rotating disc 23 and the fixed plate 24 without being obstructed by the opaque layers 26, 28 and 29 is detected as electric signals by detecting elements 31 and 32. Since the location of the first group of opaque layers 28 is in the deviation of a half pitch to the second group of opaque layers 29, the pulse signal $\phi_A$ detected by the detecting element 31 is 90° out of phase with the pulse signal $\phi_B$ detected by the detecting element 32.

Referring again to FIG. 1, the two pulse signals $\phi_A$ and $\phi_B$ developed by the movement detector 18 are delivered through wires $L_2$ and $L_1$. The d-c motor further includes a controller 19 which receives a control voltage through a wire $L_3$ and controls the rotating speed of the d-c motor. Also, the d-c motor 17 has a generator 20 delivering a d-c voltage corresponding to the rotating speed through a wire $L_4$.

Reference numeral 22 denotes a table (a controlled member) which can be moved in the x direction by a screw 21 coupled to the d-c motor 17. The present invention is directed to the control circuit being capable of moving this table to the predetermined position.

Symbols $\phi_A$ and $\phi_B$ denote two pulses produced by the movement detector 18 for each movement of the controlled member 22 by a predetermined distance (a unit distance of, for example, 5 $\mu$m). The phases of the two pulses will be reversed depending upon the moving direction of the controlled member 22. Namely, when the controlled member 22 moves in one direction (hereinafter referred to as forward direction or UP), the pulse $\phi_A$ is in advance of the pulse $\phi_B$ by 90°. When the controlled member 22 moves in the opposite direction (hereinafter referrred to as reverse direction or DOWN), the pulse $\phi_B$ is in advance of the pulse $\phi_A$ (See FIG. 2).

Reference numeral 1 denotes an up/down encoder which receives the pulses $\phi_A$ and $\phi_B$ from movement detector 18 and which produces an UP signal or a DOWN signal. When the pulse $\phi_B$ is of a low level and the pulse $\phi_A$ rises from the low level to a high level, the up/down encoder 1 produces an UP signal, and when the pulse $\phi_B$ is of the high level and the pulse $\phi_A$ rises from the low level to the high level, it produces a DOWN signal. Here, as will be obvious from the above description, when the pulse $\phi_B$ is of the low level and the pulse $\phi_A$ rises from the low level to the high level, the controlled member 22 is moving in the forward direction, i.e., in the UP direction, and when the pulse $\phi_B$ is of the high level and the pulse $\phi_A$ rises from the low level to the high level, the controlled member 22 is moving in the reverse direction, i.e., in the DOWN direction. Reference numeral 2 represents a present address counter consisting of an up/down counter which receives the up signal or the down signal as a count-up signal or a count-down signal. For the purpose of convenience, addresses are set onto each of the positions of the controlled member. Therefore, the content of the counter 1 indicates the present position of the controlled member, i.e., the content of the counter 2 indicates an address. Reference numeral 3 denotes an object address register for storing an object position (destination) of the controlled member, i.e., for storing an object address designated from an address designation circuit 11, 4 an inverter group consisting of inverters of n bits, which receives a binary signal PA of n bits of the present address counter 2 which indicates the present address of the controlled member, and which produces a signal $\overline{PA}$ which is an inverted from of the binary signal PA, 5 an inverter group consisting of n units of inverters, which receives a binary signal OA of n bits which indicates the address of an object position of the object address register 3 and which produces a signal $\overline{OA}$ which is an inverted form of the binary signal OA, 6 a full adder which has input terminal A and B for inputing the above signals OA and $\overline{PA}$ and a carry input terminal Co, 7 a full adder which adds the above signals PA and $\overline{OA}$ having the same function as the full adder 6, and reference numeral 8 represents a positive value selector which transmits a positive binary output of either one of the output $\overline{PA} - OA$ of the full adder 6 or the output $\overline{OA} - PA$ of the full adder 7. The positive value selector 8 is substantially composed of a multiplexer which is controlled by the inverse SIGN of a carry overflow signal $\overline{SIGN}$ of the full adder 7. This selector 8 has a function inverting input signals supplied to the input terminals $\overline{A}$ and $\overline{B}$ thereof.

As for the difference between the present address of the counter 2 and the object address of the register 3, the control device individually detects the absolute values and distinguishes positive values over negative values, and, based upon the data of such values, produces a driving voltage for the d-c motor by way of a DA converter as described below to effect the position determining control. A great driving voltage will be produced if the distance is great between the present position of the controlled member and the predetermined position; therefore, the motor first runs at high speeds and then runs at gradually decreasing speeds.

Figure 4:
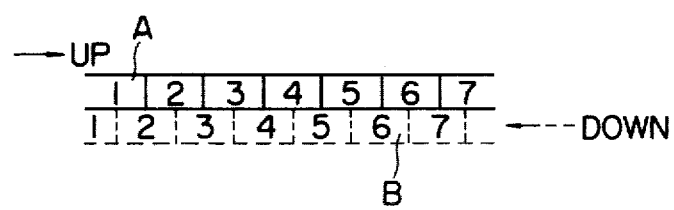
FIG. 4 is a diagram showing the deviation of addresses by half pitch in the different directions of movement of the controlled member.

Here, as will be obvious from the time chart of FIG. 2, the control device produces up and down signals when the pulse $\phi_A$ is raised. In this case, however, a phase difference is produced with respect to the position of the controlled member depending upon whether the controlled member is moving toward the UP direction or the DOWN direction. This is because, if the controlled member of the positioning device is stopped at a position midway between the neighbouring two addresses, the member will be caused to move in the UP direction even by a slight vibration and in the DOWN direction at the next moment. Or, in other words, up signals and down signals are alternately generated within very short periods of time, making it difficult to deal with them. In general, systems are usually controlled by control pulses, wherein it is impossible to treat the signls generated at timings deviated from the timings of the control pulses and, besides, if turn on and off of signals are repeated within very short periods of time, the subsequent stages cannot follow making it difficult to process information. As shown in FIGS. 3 and 4, therefore, the positions occupied by the addresses of the controlled member are deviated by a half pitch for each of the cases in which the controlled member moves in the UP direction and in which the controlled member moves in the DOWN direction, and a place at which a DOWN pulse will be produced is set at a middle point between the two places at which UP pulses will be produced, thereby to prevent the UP and DOWN pulses from being alternately generated by vibration or the like.

Reference numeral 10 denotes a correcting circuit. In this correcting circuit 10, a symbol NOT 1 represents an inverter for inverting the output signal $\phi_A$ of the movement detector, NOT 2 an inverter for inverting the output signal $\phi_B$, NAND 1 a NAND circuit which receives the signal $\phi_A$ and the output $\overline{\phi_B}$ of NOT 2, NAND 2 a NAND circit which receives the signals $\phi_A$ and $\phi_B$, 9 a flip-flop which is set by an output Is of the NAND 1 and which reset by an output $I_R$ of the NAND 2, AND 1 an AND circuit which receives an output Q of the flip-flop 9 and the output $\overline{\phi_A}$ of NOT 1, and AND 2 represents an AND circit which receives an output $\overline{Q}$ of the flip-flop 9 and an output $\phi_A$ of NOT 2. The output of AND 1 is applied to a carry input terminal Co of the full adder 7, and the output of AND 2 is applied to a carry input terminal Co of the full adder 6.

Reference numeral 12 denotes a digital-to-analog converter (D/A converter) for converting the digital signal |OA−PA| delivered from the selector 8 to an analog signal, 13 an extraction circuit for extracting the square root of the output voltage of the D/A converter 12, 14 a polarization circuit for polarizing the analog signal obtained as the absolute value through the D/A converter 12 to a positive or a negative signal depending upon the DOWN or the UP direction, 15 a subtracting point disposed to subtract a generated voltage of the d-c motor 17 from the output voltage of the polarization circuit 14, and 16 an amplifier circuit for driving the controller 19 of the d-c motor 17.

Figure 1:
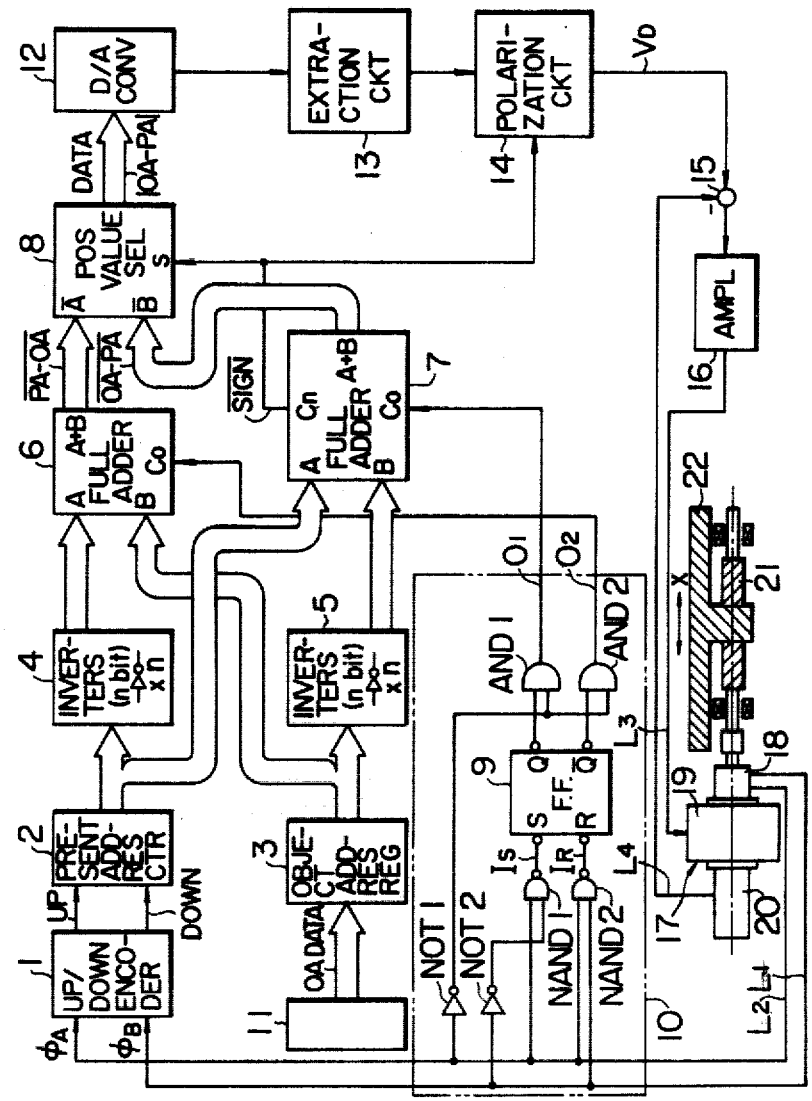
FIG. 1 is a block diagram of the control circuit for a positioning device using a d-c motor in accordance with the present invention.
Figure 2:
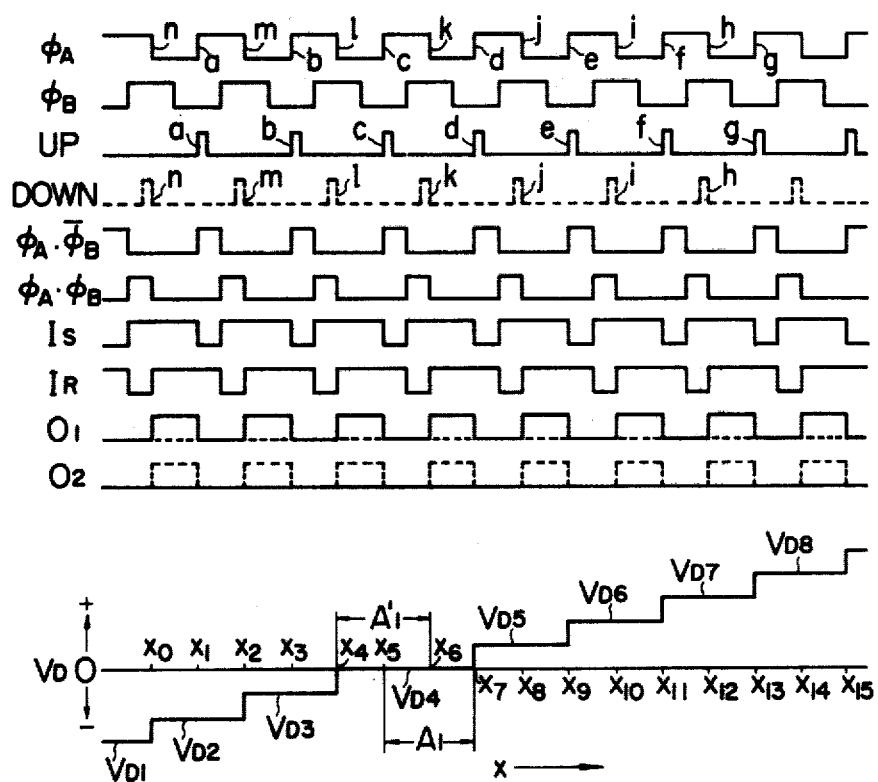
FIG. 2 is a diagram showing waveforms of various signals in the control circuit shown in FIG. 1.

Next, the operation of the circuit of FIG. 1 is mentioned below with reference to operation waveforms of FIG. 2. Referring to FIG. 2, when the pulse signal $\phi_B$ is of the low level and the pulse signal $\phi_A$ rises from the low level to the high level, the controlled member is moving in the forward direction, i.e., in the UP direction, and when the pulse signal $\phi_B$ is of the high level and the pulse signal $\phi_A$ rises from the low level to the high level, the controlled member is moving in the reverse direction, i.e., in the DOWN direction. Therefore, when the controlled member is moving in the forward direction, the up/down encoder 1 produces an up signal, and when the controlled memer is moving in the reverse direction, the up/down encoder 1 produces a down signal. The up or down signal is counted by the present address counter 2, whereby the present address is stored. While the binary signal PA of the counter 2 is fed to the inverter group 4 and the full adder 7, a binary signal OA shows the object address stored in the object address register is applied to the inverter group 5 and the full adder 6, whereby the sum of $\overline{PA}$ and OA, i.e., $\overline{PA}-OA$ is found by the full adder 6, the sum of PA and $\overline{OA}$, i.e., $\overline{OA-PA}$ is found by the full adder 7, either one of $\overline{PA-OA}$ or $\overline{OA-PA}$ whichever is of a positive value is selected by the positive value selector 8, and an absolute value |OA−PA| of the difference of binary signals corresponding to the object address and the present address is sent to the D/A converter. In finding the difference of binary coded signals corresponding to the object address and the present address, a binary signal showing an address (OA or PA) on one side is inverted by the inverter 4 or 5 and is applied to the full adder 6 or 7, and then the output of the full adder is inverted by the selector 8, in order to effect the subtraction in the adder.

Further, the two values, $\overline{PA-OA}$ and $\overline{OA-PA}$, are found because of the reasons mentioned below. That is, the difference of binary signals corresponding to the object address and the present address takes a positive value or a negative value depending upon the present position which will be located on either side of the object position. Here, however, at least an absolute value as well as a positive or a negative sign is necessary as a data for driving the d-c motor. Therefore, both the value consisting of the present address from which is subtracted the object address and the value consisting of the object address from which is subtracted the present address, are found, and either one of them having a positive value is produced as a data for indicating the absolute value. Whether the difference is of a positive value or a negative value can be detected by the output $\overline{SIGN}$ of the overflow carry terminal Cn of either one of the full adder 6 or the full adder 7 (full adder 7 according to this embodiment). When the signal PA is greater than the signal OA in the DOWN direction, the output $\overline{SIGN}$ of the overflow carry terminal Cn of the full adder 7 becomes "0", whereby the positive value selector 8 selects the full adder 6 and produces a signal of positive sign to the polarization circuit 14. Conversely, when the signal PA is smaller than the signal OA in the UP direction, the output $\overline{SIGN}$ becomes "1", and the output $\overline{SIGN}$ of the overflow carry terminal Cn becomes "1", whereby the positive value selector 8 selects the full adder 7 and produces a signal of negative sign to the polarization circuit 14. The polarity of voltage applied to the d-c motor is determined by the signal $\overline{SIGN}$ which serves as a positive sign or a negative sign, and the value (absolute value) of voltage applied to the d-c motor is determined by the absolute value |OA−PA|.

Let it be supposed that the initial set position of the controlled member 22 lies in $A_1$ between $x_5$ and $x_7$. Let it further be supposed that the present position of the controlled member is $x_0$. When the controlled member 22 is located at $x_0$, a binary signal of the present address counter 2 is smaller than a binary signal of the object address register 3.

A driving voltage $V_{D1}$ has been supplied to the d-c motor 17, and the controlled member 22 moves starting from $x_0$ toward the forward direction depending upon the turn of the d-c motor.

When the controlled member 22 moved to a position $x_1$, the movement detector 18 produces a signal $\phi_a$, whereby the up/down encoder 1 produces an up signal to a position a in FIG. 2. Responsive to the up signal, the present address counter 2 increases the binary signal by 1. As a result, the difference between the binary signal of the counter 2 and the binary signal of the register 3 decreases by 1, and the driving voltage applied to the d-c motor is decreased from $V_{D1}$ to $V_{D2}$.

When the controlled member 22 has moved from $x_1$ to $x_3$, the driving voltage applied to the d-c motor is decreased from $V_{D2}$ to $V_{D3}$.

When the controlled member has moved from $x_3$ to $x_5$, the binary signal of the counter 2 comes into agreement with the binary signal of the register 3 owing to the up signal at the position c produced by the encoder 1. The driving voltage $V_{D4}$ applied to the d-c motor will be 0 volt.

Thus, as the controlled member 22 approaches the set position, the driving voltage applied to the d-c motor is decreased so that the running speed of the d-c motor is decelerated. As the controlled member reaches the preset position, the d-c motor comes into halt being commanded by the driving voltage of 0 volt.

Figure 5:
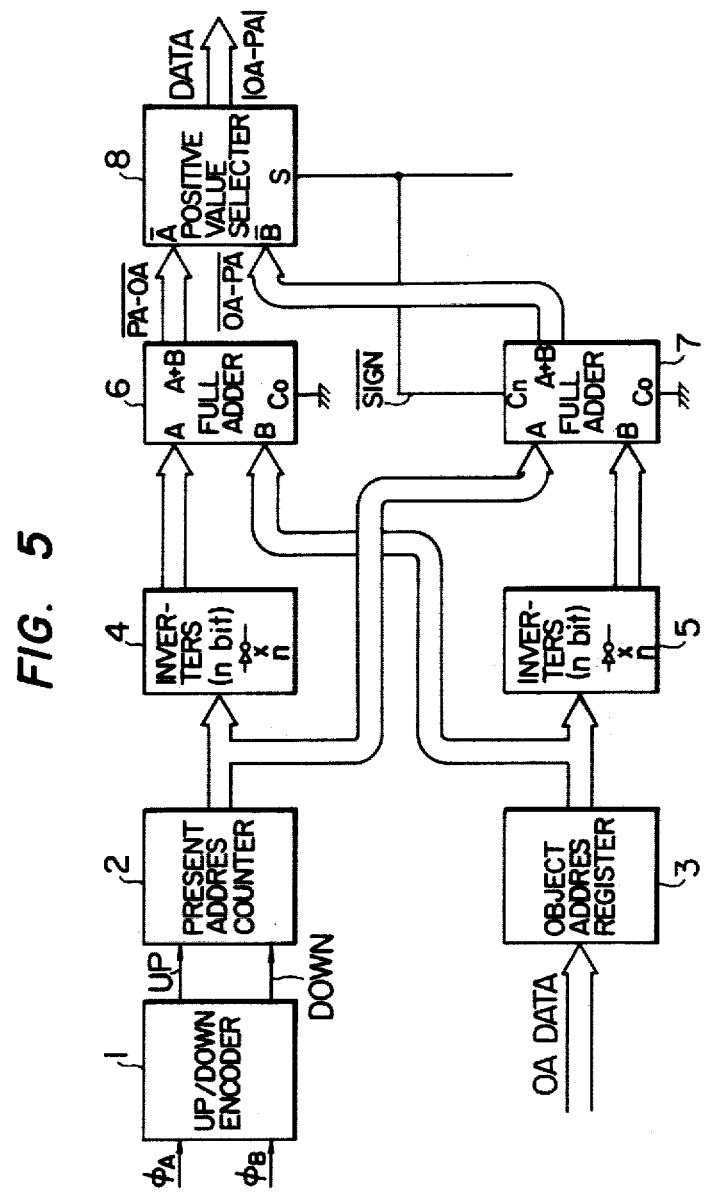
FIG. 5 is a partial block diagram of a control circuit, in which the correcting circuit in the circuit shown in FIG. 1 is taken off, for explaining the effect of the present invention.

In such a operation, according to the present invention, the hunting phenomenon is prevented by the correcting circuit 10. For easy understanding of this effect, firstly, the description deals with a problem in a control circuit of FIG. 5 from which the correcting circuit 10 shown in FIG. 1 has been taken off, referring to FIG. 6 which shows waveforms of various signal of the control circuit of FIG. 5.

The d-c motor does not quickly stop due to its rotational moment of inertia and due to other factors. Therefore, the controlled member may move in excess of the predetermined range $A_1$.

Figure 6:
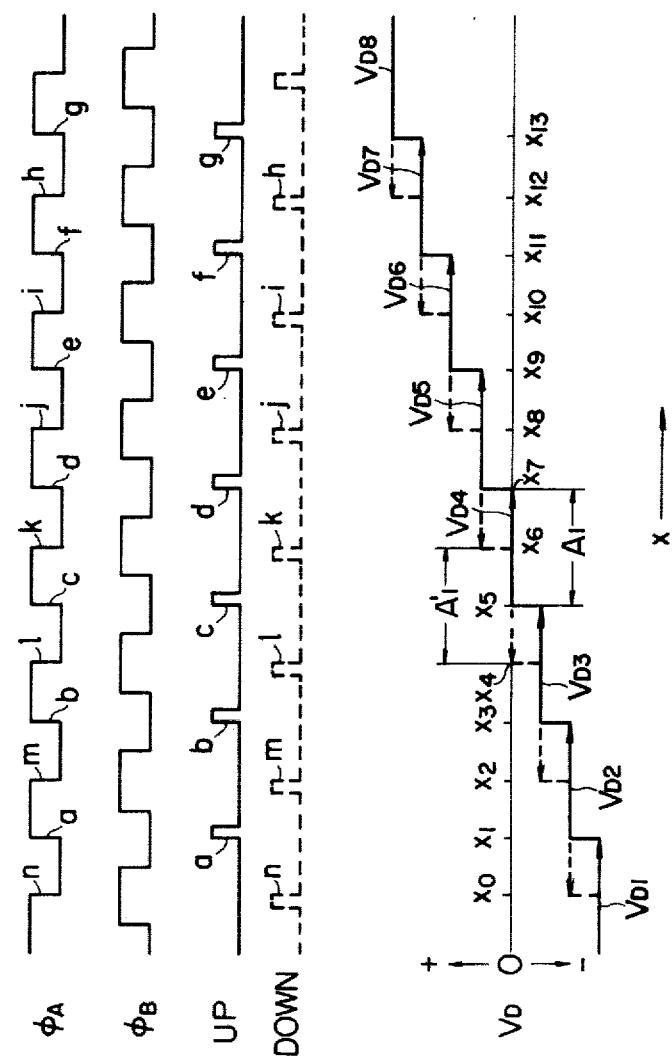
FIG. 6 is a diagram showing waveforms of various signals in the control circuit shown in FIG. 5.

As the controlled member exceeds the position $x_7$ in FIG. 6, the binary signal of the counter 2 becomes greater than the binary signal of the register 3 by 1 owing to an up signal at the position d produced by the encoder 1. Therefore, the d-c motor receives a driving voltage $V_{D5}$ of a polarity opposite to that of the driving voltages $V_{D1}$ to $V_{D3}$. Namely, the d-c motor is served with a driving voltage which causes it to run in the reverse direction.

If the controlled member further moves forward to reach a position $x_9$ due to the moment of inertia, the d-c motor is served with a greater driving voltage $V_{D6}$ of opposite polarity.

When the d-c motor is stopped after the controlled member has excessively moved up to a position $x_{10}$, the d-c motor then starts to run in the reverse direction; the controlled member starts to return toward the set position.

Since a phase difference has been given to the up signal and down signal as mentioned above and there is no the correcting circuit, the down signal is not produced even during the controlled member is moving from the position $x_9$ to the position $x_8$.

When the controlled member has returned to the position $x_8$, the encoder 1 produces a down signal at a position j. The driving voltage is decreased from $V_{D6}$ to $V_{D5}$.

Similarly, when the controlled member has returned to the position $x_6$, the driving voltage is decreased from $V_{D5}$ to 0 volt due to the down signal. That is to say, the d-c motor is served with the driving voltage $V_{D5}$ for running in the reverse direction even after the controlled member has returned to near the center of the initial preset range.

The controlled member which has returned to the position $x_6$ may appear to stop at that position because the driving voltage is 0 volt. In practice, however, there are a time deviation between the detection of movement and the control of driving voltage, and the timing by which the motor is changed from the accelerating state to the decelerating state is lagged, resulting in excess return.

Therefore, as the controlled member returns in excess of the position $x_4$, the d-c motor is served again with the driving voltage $V_{D3}$ for running in the forward direction.

The abovementioned phase difference between the up signal and the down signal and the lag in timing give rise to the occurrence of hysteresis characteristics with respect to the position of the controlled member. The controlled member develops hunting, i.e., repeats the movement among the positions $x_5 \rightarrow x_7 \rightarrow x_6 \rightarrow x_4 \rightarrow x_5 \rightarrow x_7 \rightarrow x_6 \rightarrow x_4$. This is a cause of vibration of the apparatus.

According to the present invention as shown in FIG. 1, a correcting signal for decreasing the absolute value of the driving voltage is obtained by the correcting circuit 10 prior to the up signal or down signal that will be produced in the next time, by utilizing an output signal of the movement detector. The correcting signal makes it possible to substantially remove the abovementioned hysteresis characteristics in the driving voltage applied to the d-c motor.

Referring again to FIGS. 1 and 2, the correcting circuit 10 will be described.

The circuit 10 has been added to prevent the hunting. In this circuit, the inverse signal Is of the pulse signal $\phi_A \cdot \bar{\phi}_B$ is produced by the NAND 1 while the inverse signal Ir of the pulse signal $\bar{\phi}_A \cdot \phi_B$ is produced by the NAND 2. The flip-flop 9 is set by the signal Is and is reset by the signal $I_R$. When the signal $\phi_A$ is of the low level, the outputs $O_1$ and $O_2$ of the flip-flop 9 are applied to the carry terminal Co of the full adder 6 and to the carry terminal Co of the full adder 7, respectively.

As mentioned above, the hunting stems from the so-called hysteresis characteristics or from the deviation of position at which the driving signal for UP movement is produced and position at which the driving signal for DOWN movement is produced, or from the deviation between the object address during the UP movement and the object address during the DOWN movement. The hunting can be prevented if the hysteresis characteristics are eliminated. For this purpose, the command voltages should be increased each by a quantity of one level between $x_0$ and $x_1$, between $x_2$ and $x_3$, and between $x_4$ and $x_5$ in FIG. 6, and the command voltages should be decreased each by a quantity of one level between $x_6$ and $x_7$, between $x_8$ and $x_9$, between $x_{10}$ and $x_{11}$, and between $x_{12}$ and $x_{13}$.

In effect, when the controlled member is moving in the UP direction, a pulse Is is generated. Then, when the pulse $\phi_A$ is of the low level after the pulse $I_R$ has been generated, the command voltage should be increased by a quantity of one level (a voltage corresponding to a given address). When the controlled member is moving in the DOWN direction, the pulse $I_R$ is generated. Then, when the pulse $\phi_A$ is of the low level after the pulse $I_S$ has been generated, the command voltage should be decreased by a quantity of one level.

Depending upon whether the pulses have reached in the order of pulse $I_S$ and pulse $I_R$, or in the order of pulse $I_R$ and pulse $I_S$, the NAND 1, NAND 2 and flip-flop 9 determine in regard to whether the level should be increased or decreased while the pulse $\phi_A$ is of the low level. When the pulse signal $\phi_A$ is of the low level, the AND 1 and AND 2 sends the output of the flip-flop 9 to the carry terminals Co of the full adders 6 and 7. When "1" is applied to the carry terminal of the full adder 6, the output of the full adder 6 is increased by +1 so that the level is increased by a quantity of one level. When "1" is applied to the carry terminal of the full adder 7, on the other hand, the level is decreased by one level even if the output of the full adder 7 is increased by +1 because the full adder 7 performs the calculation $\overline{OA} - \overline{PA}$.

Concretely speaking, when the signal $I_S$ is first produced, and the signal $I_R$ is then produced, the flip-flop 9 is set by the signal $I_S$ and is reset by the signal $I_R$, whereby the output $\overline{Q}$ becomes "0" and the output Q becomes "1". Thereafter, when the pulse signal $\phi_A$ is of the low level, the output Q is allowed to pass through the AND 2 and is applied as the signal $O_1$ to the carry terminal Co of the full adder 7, such that the output is increased by quantity of one level. Conversely, when the signal $I_R$ is produced and then the signal $I_S$ is produced, the fli-flop is reset by the signal $I_R$ and is set by the signal $I_S$, whereby the output Q becomes "0" and the output $\overline{Q}$ becomes "1". Thereafter, when the pulse signal $\phi_A$ is of the low level, the output $\overline{Q}$ is applied as the signal $O_2$ to the carry terminal Co of the full adder 6 via the AND 2, such that the output is ultimately decreased by a quantity of one level.

As a result, no hysteresis remains in the waveforms of command voltages as shown in $V_D$ of FIG. 2.

That is to say, according to the present invention, the UP direction or the DOWN direction is determined by the flip-flop which is set by the output $I_S$ and which is reset by the output $I_R$. Based upon the thus determined results, the output is increased or decreased by a quantity of one level by sending a signal to the carry terminal Cn of either one of the two full adders while the pulse signal $\phi_A$ is of the "0" level (this is a timing necessary for increasing or decreasing the level by a quantity of one level). It is, therefore, made possible to obtain command signals without hysteresis, preventing the vibration from being developed. The output of AND 1 of the abovementioned embodiment can be so modified as to be added as an analog addition voltage to the D/A converter. Similarly, the output of AND 2 can be added as an analog subtraction voltage to the D/A converter.

Although a preferred embodiment of the invention has been described, it will be understood that various changes, substitutions and alterations can be made therein without departing from the spirit and scope of the invention.

What is claimed is:

1. A control circuit of a positioning device for moving a member to be controlled to a predetermined position by using a d-c motor comprising:

encoder means for receiving first and second repeated pulse signals being produced for each movement of said member to be controlled by a predetermined unit distance and having opposite phases depending upon the opposite directions of said member, and for producing a first trigger signal when said first repeated pulse signal has a phase preceding the phase of the second repeated pulse signal in one moving direction of said member and a second trigger signal when said first repeated pulse signal has a phase lagged behind the phase of said second repeated pulse signal in the other moving direction of said member;

counter means for receiving said first and second trigger signals depending upon the moving directions of said member, and for producing a binary coded signal responsive to a position of said member to be controlled;

memory means for providing a predetermined binary coded signal corresponding to the predetermined position;

arithmetic circuit means for producing a difference binary coded signal representative of the difference between the binary coded signals of said counter means and said memory means;

driving circuit means for driving the d-c motor coupled to said member to be controlled, said driving circuit means producing a driving signal of a level corresponding to the difference binary coded signal of said arithmetic circuit means;

correcting circuit means for receiving said first and second repeated pulse signals and for producing a correcting pulse signal preceding said first or second trigger signal; and connection means for providing said correcting pulse signal to said arithmetic circuit means so as to cause said difference binary coded signal between the binary coded signals of said counter means and said memory means to be small, whereby the level of the driving signal in said driving circuit means is decreased by said correcting signal.

2. A control circuit of a positioning device according to claim 1, wherein said correcting circuit means includes a flip-flop circuit being set by said first repeated pulse signal and being reset by said second repeated pulse signal, and a gate circuit receiving one of said first and second repeated pulse signals as a gate signal and transferring the output of said flip-flop circuit; and wherein said connection means is adapted to provide the output of said flip-flop circuit to a carry terminal of said arithmetic circuit means through said gate circuit.

* * * * *